(12) United States Patent
Debnath

(10) Patent No.: US 12,200,111 B2
(45) Date of Patent: Jan. 14, 2025

(54) AUTOMATIC GENERATION AND UPDATE OF CONNECTIVITY ASSOCIATION KEYS FOR MEDIA ACCESS CONTROL SECURITY PROTOCOL

(71) Applicant: Juniper Networks, Inc., Sunnyvale, CA (US)

(72) Inventor: Nandan Debnath, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 216 days.

(21) Appl. No.: 17/808,351

(22) Filed: Jun. 23, 2022

(65) Prior Publication Data

US 2023/0421360 A1    Dec. 28, 2023

(51) Int. Cl.
*H04L 29/06* (2006.01)
*H04L 9/08* (2006.01)

(52) U.S. Cl.
CPC .......... *H04L 9/0825* (2013.01); *H04L 9/0838* (2013.01); *H04L 9/0861* (2013.01)

(58) Field of Classification Search
CPC ..... H04L 9/0861; H04L 9/3226; H04L 9/085; H04L 9/0825
See application file for complete search history.

(56) References Cited

U.S. PATENT DOCUMENTS

| | | | | |
|---|---|---|---|---|
| 8,707,020 | B1 * | 4/2014 | Lengyel | H04L 63/0428 370/252 |
| 2007/0079362 | A1 * | 4/2007 | Lortz | H04L 63/162 726/5 |
| 2014/0093072 | A1 * | 4/2014 | Biradar | H04L 63/08 380/44 |
| 2022/0158826 | A1 * | 5/2022 | Gordon | H04L 9/0869 |
| 2022/0311642 | A1 * | 9/2022 | Gordon | H04L 63/08 |
| 2022/0360605 | A1 * | 11/2022 | Baheri | H04L 41/0654 |
| 2023/0163958 | A1 * | 5/2023 | Sheng | H04L 63/0876 713/171 |
| 2023/0421360 | A1 * | 12/2023 | Debnath | H04L 9/0825 |

FOREIGN PATENT DOCUMENTS

CN    101282208 B    4/2011

OTHER PUBLICATIONS

European Search Report for Application No. EP22190278.6, mailed on May 17, 2023, 5 pages.

* cited by examiner

*Primary Examiner* — Dao Q Ho
(74) *Attorney, Agent, or Firm* — Harrity & Harrity, LLP

(57) ABSTRACT

A first network device may identify a MACsec session between the first network device and a second network device that utilizes a CAK, may determine, using a KDF and one or more KDF input parameters, an additional CAK, may encrypt the one or more KDF input parameters and/or KDF identification information that identifies the KDF and the one or more KDF input parameters to generate encrypted KDF input information, and may send, to the second network device, a first message that includes the encrypted KDF input information. The first network device may receive, from the second network device, based on sending the first message, a second message that includes a checksum value, may determine, based on the checksum value, that the second network device has determined the additional CAK, and may communicate, with the second network device, to cause the MACsec session to utilize the additional CAK.

20 Claims, 9 Drawing Sheets

AUTOMATIC GENERATION AND UPDATE OF CONNECTIVITY ASSOCIATION KEYS FOR MEDIA ACCESS CONTROL SECURITY PROTOCOL

BACKGROUND

Media access control security (MACsec) is a security standard, defined by the Institute of Electrical and Electronics Engineers (IEEE) 802.1AE, that defines connectionless data confidentiality and integrity for media access independent protocols.

SUMMARY

Some implementations described herein relate to a method. The method may include identifying, by a first network device, a MACsec session between the first network device and a second network device, where the MACsec session utilizes a connectivity association key (CAK). The method may include determining, by the first network device and using a key derivation function (KDF) and one or more KDF input parameters, an additional CAK. The method may include encrypting, by the first network device, at least one of the one or more KDF input parameters or KDF identification information that identifies the KDF and the one or more KDF input parameters to generate encrypted KDF input information. The method may include sending, by the first network device and to the second network device, a first message that includes the encrypted KDF input information. The method may include receiving, by the first network device, from the second network device, and based on sending the first message, a second message that includes a checksum value. The method may include determining, by the first network device and based on the checksum value, that the second network device has determined the additional CAK. The method may include communicating, by the first network device and with the second network device, to cause the MACsec session to utilize the additional CAK.

Some implementations described herein relate to a first network device. The first network device may include one or more memories and one or more processors. The first network device may be configured to determine, using a KDF and one or more KDF input parameters, a CAK for a MACsec session between the first network device and a second network device. The first network device may be configured to encrypt at least one of the one or more KDF input parameters or KDF identification information that identifies the KDF and the one or more KDF input parameters to generate encrypted KDF input information. The first network device may be configured to send, to the second network device, a first message that includes the encrypted KDF input information. The first network device may be configured to receive, from the second network device and based on sending the first message, a second message. The first network device may be configured to communicate, with the second network device and based on the second message, to cause the MACsec session to utilize the CAK.

Some implementations described herein relate to a non-transitory computer-readable medium that stores a set of instructions for a second network device. The set of instructions, when executed by one or more processors of the second network device, may cause the second network device to receive, from a first network device, a first message that includes encrypted KDF input information. The set of instructions, when executed by one or more processors of the second network device, may cause the second network device to process the first message to determine the encrypted KDF input information. The set of instructions, when executed by one or more processors of the second network device, may cause the second network device to decrypt the encrypted KDF input information to determine at least one of one or more KDF input parameters or KDF identification information that identifies the KDF and the one or more KDF input parameters. The set of instructions, when executed by one or more processors of the second network device, may cause the second network device to determine, based on determining at least one of the one or more KDF input parameters or the KDF identification information that identifies the KDF and the one or more KDF input parameters, a CAK for a MACsec session between the first network device and the second network device. The set of instructions, when executed by one or more processors of the second network device, may cause the second network device to determine, based on the CAK, a checksum value. The set of instructions, when executed by one or more processors of the second network device, may cause the second network device to send, to the first network device, a second message that includes the checksum value.

DETAILED DESCRIPTION

Figure 1A:
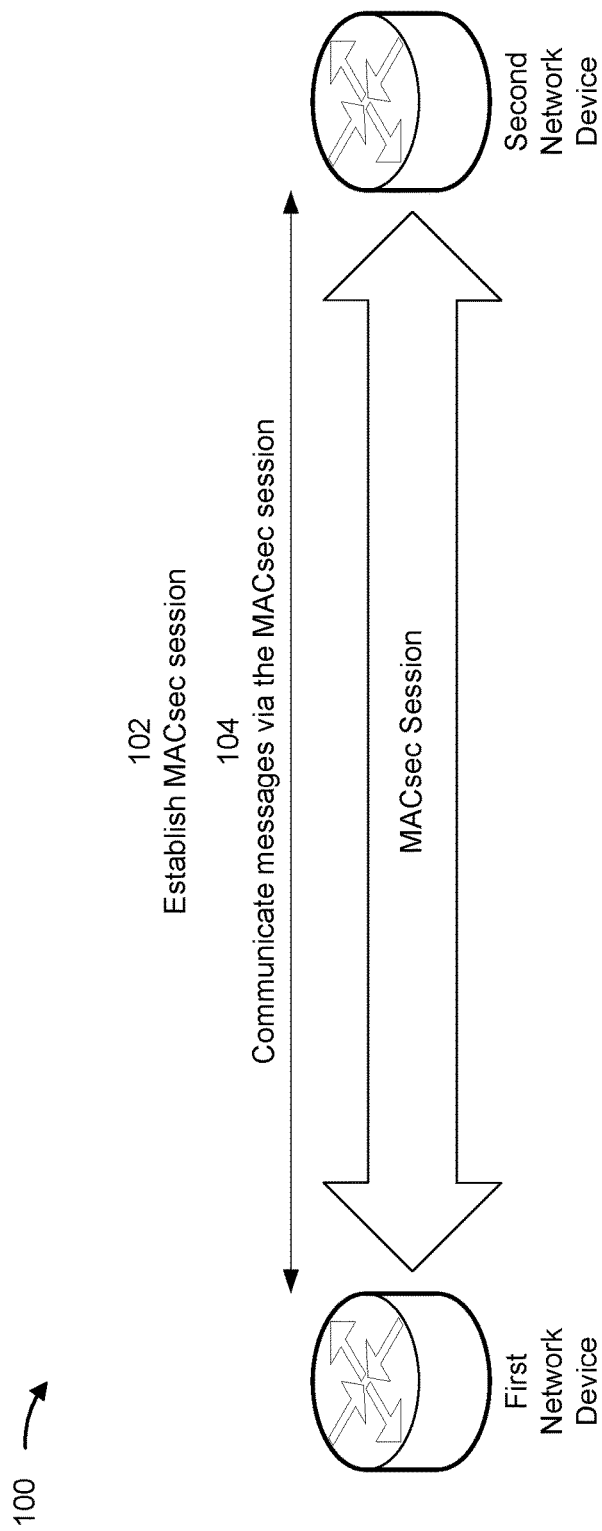
FIGS. 1A-1D are diagrams of one or more example implementations described herein.

The following detailed description of example implementations refers to the accompanying drawings. The same reference numbers in different drawings may identify the same or similar elements.

The MACsec protocol enables two network devices to securely communicate via a MACsec session between the network devices. The MACsec session utilizes a CAK to enable secure communication between the network devices. For example, each of the network devices may derive and/or generate other keys, such as a secure association key (SAK) and/or a key encryption key (KEK), to encrypt communications between the network devices. While the keys derived from the CAK can be automatically updated and/or changed at any time (by the network devices), a change to a CAK requires a manual intervention by a system administrator of the network devices. In some cases, the system administrator may manually configure the network devices with a "keychain" of CAKs and a schedule indicating when each CAK is to be utilized by the MACsec session. However, this requires a use of computing resources (e.g., processing resources, memory resources, communication resources, and/or power resources, among other examples) of the network devices to maintain the keychain and to ensure that the network devices are synchronized (e.g., to ensure that the network devices are using the same CAK at the same time). Further, after all the CAKs in the keychain have been used, the system administrator again has to manually configure the network devices with a new keychain of CAKs.

Some implementations described herein provide a first network device and a second network device that are connected via a MACsec session. The first network device may determine a new CAK for the MACsec session (e.g., on a scheduled basis, or on a triggered basis, such as based on a security threat determination). The first network device may use a KDF and one or more KDF input parameters to generate the new CAK and, accordingly, may encrypt the one or more KDF input parameters and/or KDF identification information that identifies the KDF and/or the one or more KDF input parameters to generate encrypted KDF input information. The first network device may send, to the second network device, a first message (e.g., a MACsec key agreement protocol data unit (MKPDU)) that includes the encrypted KDF input information. The second network device may decrypt the encrypted KDF input information of the first message to determine the one or more KDF input parameters and/or the KDF identification information. Accordingly, the second network device may use the one or more KDF input parameters and/or the KDF identification information to determine the new CAK (e.g., the same CAK determined by the first network device). The second network device then may determine a checksum value (e.g., based on the new CAK) and may send, to the first network device, a second message (e.g., an MKPDU) that includes the checksum value. The first network device may validate the checksum value of the second message (e.g., by determining an additional checksum value based on the new CAK that was generated by the first network device and determining that the checksum value and the additional checksum value match). Accordingly, the first network device may determine that the second network device has determined the new CAK and the first network device and the second network device then may communicate to cause the MACsec session to utilize the new CAK (e.g., because both the first network device and the second network device have determined the same new CAK for the MACsec session).

In this way, some implementations described herein enable automatic generation and update of CAKs for MACsec sessions. Accordingly, the first network device and the second network device do not need to be manually configured (e.g., by a system administrator) with new CAKs. Additionally, the first network device and the second network device do not need to use computing resources (e.g., processing resources, memory resources, communication resources, and/or power resources, among other examples) to maintain a keychain of CAKs and/or to ensure that the first network device and the second network device are synchronized (e.g., because the first network device and the second network device may determine and utilize a new CAK regardless of schedule and/or synchronization of the first network device and the second network device).

FIGS. 1A-1D are diagrams of one or more example implementations 100 described herein. Example implementation(s) 100 may include a first network device and a second network device in a network. The first network device and the second network device are described in more detail below in connection with FIGS. 2-4.

As shown in FIG. 1A, and by reference number 102, the first network device and the second network device may establish a MACsec session (also referred to as a MACsec key agreement (MKA) session). For example, the first network device and the second network device may perform a handshake procedure, in which the network devices exchange information to establish the MACsec session. The MACsec session may utilize a CAK. For example, the first network device and/or the second network device may process the CAK to generate and/or determine one or more encryption keys, such as a SAK or KEK, to be used to encrypt and/or decrypt information that is to be communicated between the first network device and the second network device via the MACsec session. The MACsec session may have a name (e.g., "ABCD"), also referred to as a CAK name or a connectivity association key name (CKN), to enable the first network device and the second network device to identify the MACsec session and differentiate the MACsec session from other MACsec sessions associated with the network devices.

As shown by reference number 104, the first network device and the second network device may communicate messages via the MACsec session. In some implementations, the messages may be "hello" messages (also referred to as "keep-alive" messages) that the first network device and/or the second network device periodically send to each other to maintain the MACsec session. For example, the messages may be MKA protocol data unit (MKPDU) messages, each of which includes a name field (e.g., a CAK name field or a CKN field) that identifies the name of the MACsec session (e.g., to indicate to a recipient network device that the MACsec session should be maintained).

Figure 1B:
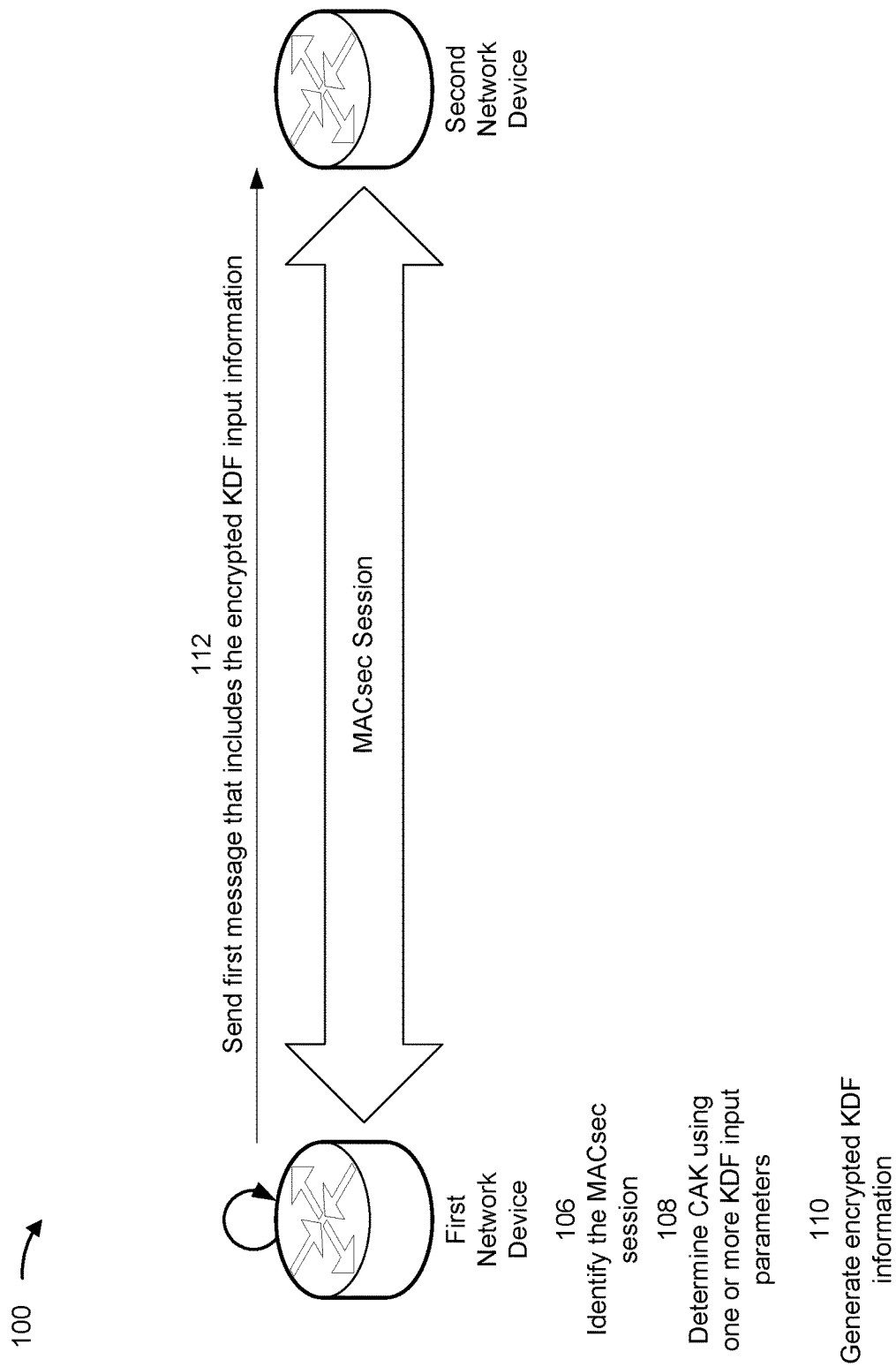

As shown in FIG. 1B, and by reference number 106, the first network device may identify the MACsec session (e.g., as part of a process to update the CAK for the MACsec session). For example, the first network device, on a scheduled basis, on an on-demand basis, on a triggered basis, or on an ad-hoc basis, among other examples, may identify the MACsec session to enable the first network device to update the CAK of the MACsec session.

As shown by reference number 108, the first network device may determine an additional CAK (e.g., a "new" CAK or an "updated" CAK) to be utilized by the MACsec session. For example, the first network device may identify (e.g., generate or select) and use one or more key derivation function (KDF) input parameters to generate the additional CAK. The one or more KDF input parameters may include, for example, a KDF parameter (e.g., that indicates a KDF to be used to generate the additional CAK), a key parameter to be used by the KDF, a label parameter to be used by the KDF, and/or a context parameter to be used by the KDF. Accordingly, the first network device may use the KDF (e.g., as indicated by the one or more KDF parameters), and/or one or more other parameters of the one or more KDF input parameters, to generate the additional CAK. In a representative example, the first network device may use a KDF "KDF1" with a key "KEY1," a label "LABEL1," and a context "VAR1" to generate the additional CAK.

As shown by reference number 110, the first network device may encrypt the one or more KDF input parameters and/or KDF identification information that identifies the KDF and/or the one or more KDF input parameters to generate encrypted KDF input information. For example, the first network device may use an encryption key associated with the CAK (e.g., the "current" CAK of the MACsec session), such as a secure association key (SAK) or a key encryption key (KEK), to encrypt the one or more KDF input parameters to generate the encrypted KDF input information. With reference to the representative example above, the first network device may encrypt a string "KDF1#KEY1#LABEL1#VAR1," which is a concatenation of the one or more KDF input parameters, to generate the encrypted KDF input information "2AB*^&GH JL(KB*HBN".

As shown by reference number 112, the first network device may send, to the second network device, a first message that includes the encrypted KDF information. The first message may be, for example, an MKPDU (e.g., that is associated with the MACsec session) and the encrypted KDF information may be included in a name field (e.g., a CAK name field or a CKN field) of the MKPDU. In some implementations, the first message may include an indicator (e.g., one or more characters, such as an "@" character) indicating that the first message includes the encrypted KDF input information. With reference to the representative example, the name field of the first message may include "ABCD@2AB*^&GH JL(KB*HBN," where "ABCD" is the name of the MACsec session, "@" is the indicator indicating that the first message includes the encrypted KDF input information, and "2AB*^&GH JL(KB*HBN" is the encrypted KDF input information.

Figure 1C:
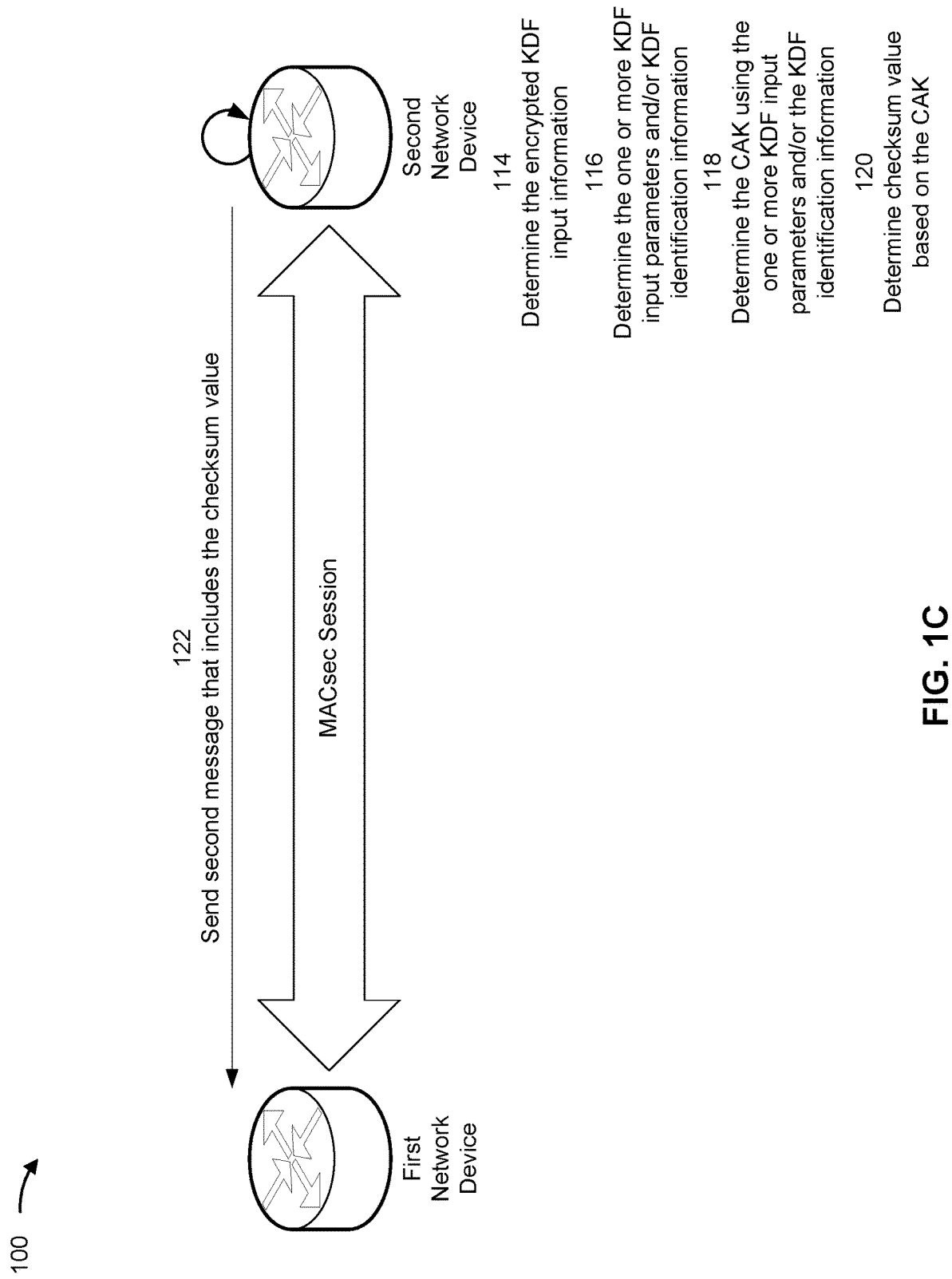

As shown in FIG. 1C, and by reference number 114, the second network device may determine the encrypted KDF input information (e.g., based on receiving the first message from the first network device). In some implementations, the second network device may process (e.g., parse and/or read) the first message to determine the encrypted KDF input information. For example, the second network device may read the name field of the first message to determine the encrypted KDF input information. As another example, the second network device may parse the name field of the first message to identify the indicator indicating that the first message includes the encrypted KDF input information (e.g., the "@" character) and may thereby identify the encrypted KDF input information. With reference to the representative example, the second network device may process the first message to identify the "@" indicator and may thereby identify the "2AB*^&GH JL(KB*HBN" encrypted KDF input information.

As shown by reference number 116, the second network device may determine the one or more KDF input parameters and/or the KDF identification information (e.g., that identifies the KDF and/or the one or more KDF input parameters). In some implementations, the second network device may decrypt the encrypted KDF information (e.g., that the second network device determined based on the first message) to determine the one or more KDF input parameters and/or the KDF identification information. For example, the second network device may use an encryption key associated with the CAK (e.g., the current CAK of the MACsec session), such as the SAK or the KEK (e.g., that the first network device used to generate the encrypted KDF information), to decrypt the encrypted KDF information and thereby determine the one or more KDF input parameters and/or the KDF identification information. In some implementations, the second network device may decrypt the encrypted KDF information based on the indicator in the first message that indicates that the first message includes the encrypted KDF input information. For example, the second device may decrypt the encrypted KDF information based on identifying the indicator in the first message (e.g., because the indicator indicates that the encrypted KDF input information is included in the name field of the first message, positioned after the indicator within the name field). With reference to the representative example, the second network device may decrypt the encrypted KDF input information "2AB*^&GH JL(KB*HBN" to determine the "KDF1#KEY1#LABEL1#VAR1" string that is a concatenation of the one or more KDF input parameters.

As shown by reference number 118, the second network device may determine the additional CAK (e.g., the new CAK or the updated CAK) that is to be utilized by the MACsec session. For example, the second network device may use the KDF and the one or more KDF input parameters to generate the additional CAK (e.g., use the KDF indicated by the KDF parameter, of the one or more KDF input parameters, and/or one or more other parameters of the one or more KDF input parameters) to generate the additional CAK. With reference to the representative example, the second network device may use the KDF "KDF1" with the key "KEY1," the label "LABEL1," and the context "VAR1" to generate the additional CAK. Additionally, or alternatively, the second network device may identify, based on the KDF identification information, the KDF and/or the one or more KDF input parameters and may thereby use the KDF and/or the one or more KDF input parameters to generate the additional CAK.

As shown by reference number 120, the second network device may determine a checksum value. For example, the second network device may process (e.g., using a hashing technique or a checksum technique) the additional CAK to determine the checksum value. Accordingly, the checksum value is associated with the second network device determining the additional CAK based on the encrypted KDF input information (e.g., that was included in the first message that was received by the second network device). With reference to the representative example, the second network device may process the additional CAK to generate the checksum value "CHKSUM34539AB".

As shown by reference number 122, the second network device may send, to the first network device, a second message that includes the checksum value. The second message may be, for example, an MKPDU (e.g., that is associated with the MACsec session) and the encrypted checksum value may be included in a name field (e.g., a CAK name field or a CKN field) of the MKPDU. In some implementations, the second message includes an indicator (e.g., one or more characters, such as a "#" character) indicating that the second message includes the checksum value. With reference to the representative example, the name field of the second message may include "ABCD#CHKSUM34539AB," where "ABCD" is the name of the MACsec session, "#" is the indicator indicating that the second message includes the checksum value, and "CHKSUM34539AB" is the checksum value.

Figure 1D:
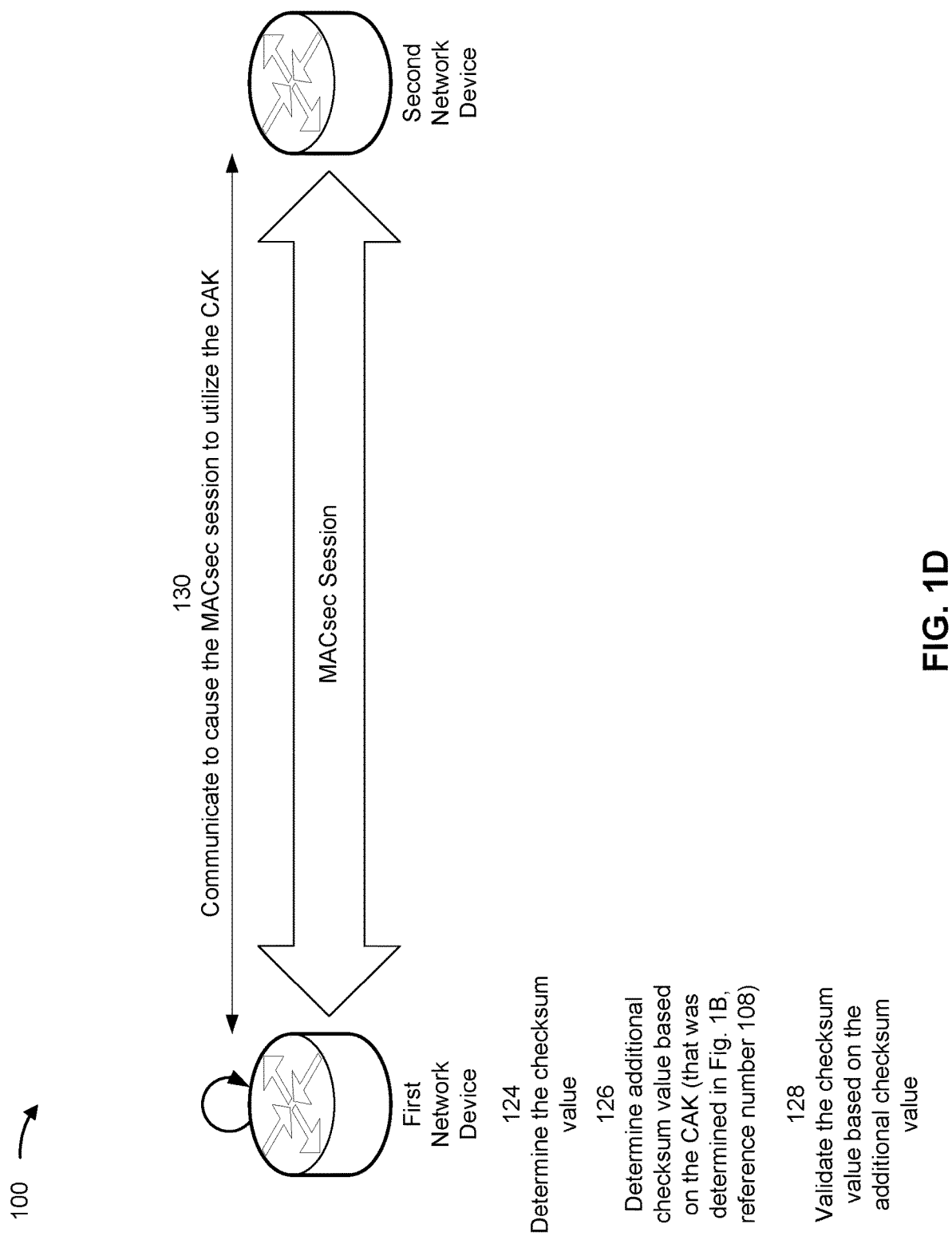

As shown in FIG. 1D, and by reference number 124, the first network device may determine the checksum value (e.g., based on receiving the second message from the second network device). In some implementations, the first network device may process (e.g., parse and/or read) the second message to determine the checksum value. For example, the first network device may read the name field of the second message to determine the checksum value. As another example, the first network device may parse the name field of the second message to identify the indicator indicating that the second message includes the checksum value (e.g., the "#" character) and may thereby identify the checksum value. With reference to the representative example, the first network device may process the second message to identify the "#" indicator and may thereby identify the "CHKSUM34539AB" checksum value.

As shown by reference number 126, the first network device may determine an additional checksum value. For example, the first network device may process (e.g., using a hashing technique or a checksum technique) the additional CAK (e.g., determined by the first network device, as described herein in relation to FIG. 1B and reference number 108) to determine the additional checksum value. With reference to the representative example, the first network device may process the additional CAK to generate the checksum value "CHKSUM34539AB".

As shown by reference number 128, the first network device may validate the checksum value (e.g., based on the additional checksum value). For example, the first network device may compare the checksum value and the additional checksum value. The first network device may validate the checksum value when the first network device determines, based on the comparison, that the checksum value matches (e.g., is equal to) the additional checksum value. The first network device may thereby determine that the second network device has determined the additional CAK (and may therefore perform one or more additional processing steps described herein). Alternatively, the first network device may not validate the checksum value when the first network device determines, based on the comparison, that the checksum value does not match (e.g., is not equal to) the additional checksum value. The first network device may thereby determine that the second network device has not determined the additional CAK and may refrain from performing any additional processing steps described herein.

As shown by reference number 130, the first network device and the second network device may communicate to cause the MACsec session to utilize the additional CAK. For example, the first network device, based on validating the checksum value and/or determining that the second network device has determined the additional CAK, may initiate a handshake procedure between the first network device and the second network device, in which the network devices exchange information (e.g., based on the additional CAK) to update the MACsec session to utilize the additional CAK. In some implementations, when updating the MACsec session to utilize the additional CAK, the first network device and the second network device may update the name of the MACsec session. For example, the first network device and the second network device may each determine, based on the additional CAK, an updated name (e.g., a new CAK name or a new CKN) of the MACsec session and may communicate messages (e.g., hello messages or keep-alive messages) to each other that include the updated name. In some implementations, the first network device may determine the updated name in association with determining the additional CAK (e.g., as described herein in relation to FIG. 1B and reference number 106) and/or the second network device may determine the updated name in association with determining the additional CAK (e.g., as described herein in relation to FIG. 1C and reference number 118).

As indicated above, FIGS. 1A-1D are provided as an example. Other examples may differ from what is described with regard to FIGS. 1A-1D.

Figure 2:
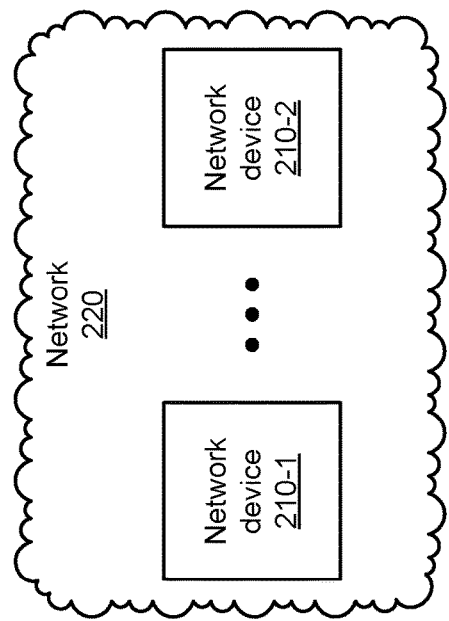
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include two network devices 210 (shown as network device 210-1 and network device 210-2) and a network 220. Devices of environment 200 may interconnect via wired connections, wireless connections, or a combination of wired and wireless connections.

Network device 210 includes one or more devices capable of receiving, processing, storing, routing, and/or providing traffic (e.g., a packet or other information or metadata) in a manner described herein. For example, network device 210 may include a router, such as a label switching router (LSR), a label edge router (LER), an ingress router, an egress router, a provider router (e.g., a provider edge router or a provider core router), a virtual router, or another type of router. Additionally, or alternatively, network device 210 may include a gateway, a switch, a firewall, a hub, a bridge, a reverse proxy, a server (e.g., a proxy server, a cloud server, or a data center server), a load balancer, and/or a similar device. In some implementations, network device 210 may be a physical device implemented within a housing, such as a chassis. In some implementations, network device 210 may be a virtual device implemented by one or more computer devices of a cloud computing environment or a data center. In some implementations, a group of network devices 210 may be a group of data center nodes that are used to route traffic flow through network 220. In some implementations, two network devices 210 (e.g., network device 210-1 and network device 210-2) may communicate via a MACsec session, as described elsewhere herein.

Network 220 includes one or more wired and/or wireless networks. For example, network 220 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
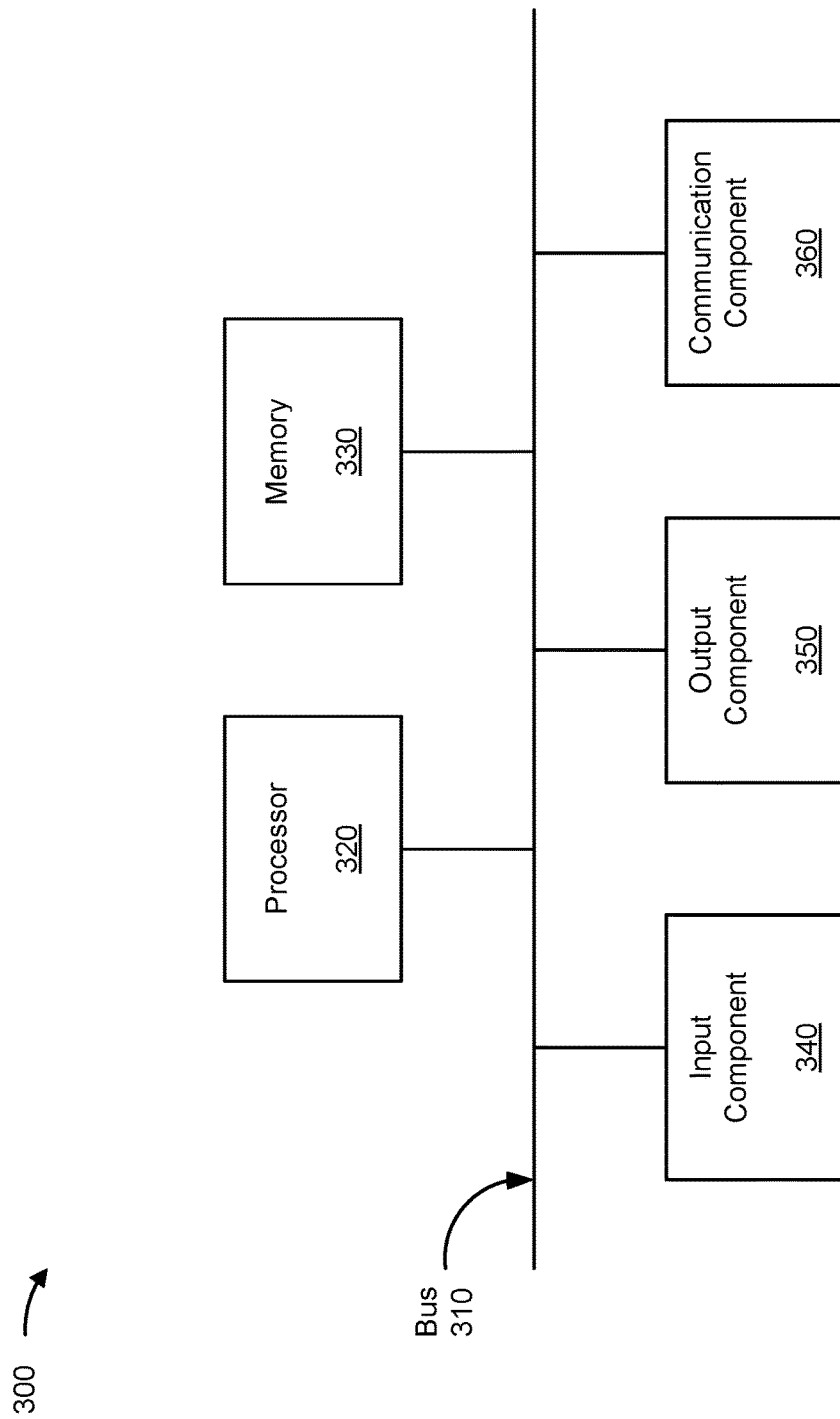
FIGS. 3 and 4 are diagrams of example components of one or more devices of FIG. 2.

FIG. 3 is a diagram of example components of a device 300, which may correspond to network device 210. In some implementations, network device 210 includes one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory).

Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
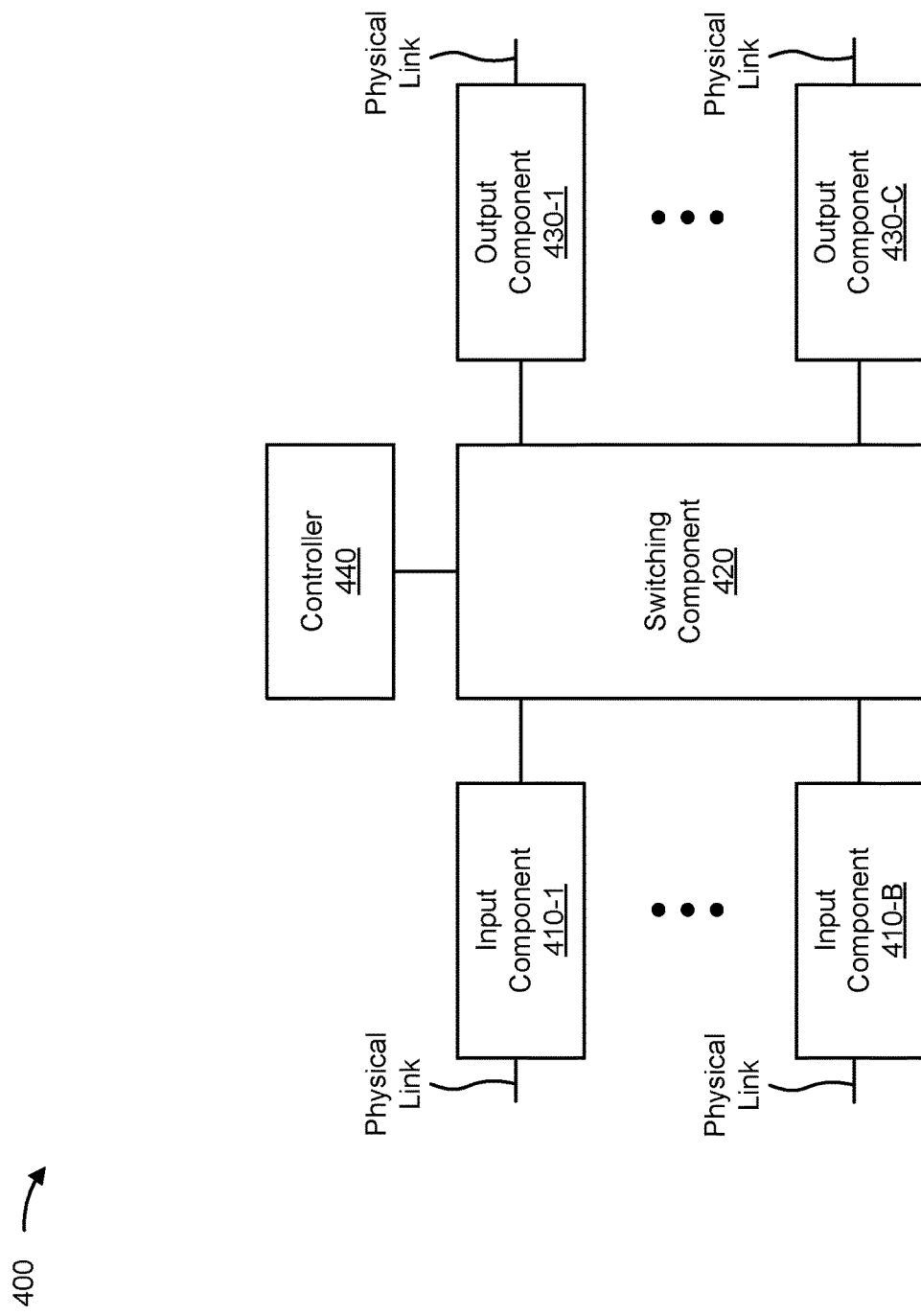

FIG. 4 is a diagram of example components of a device 400. Device 400 may correspond to network device 210. In some implementations, network device 210 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
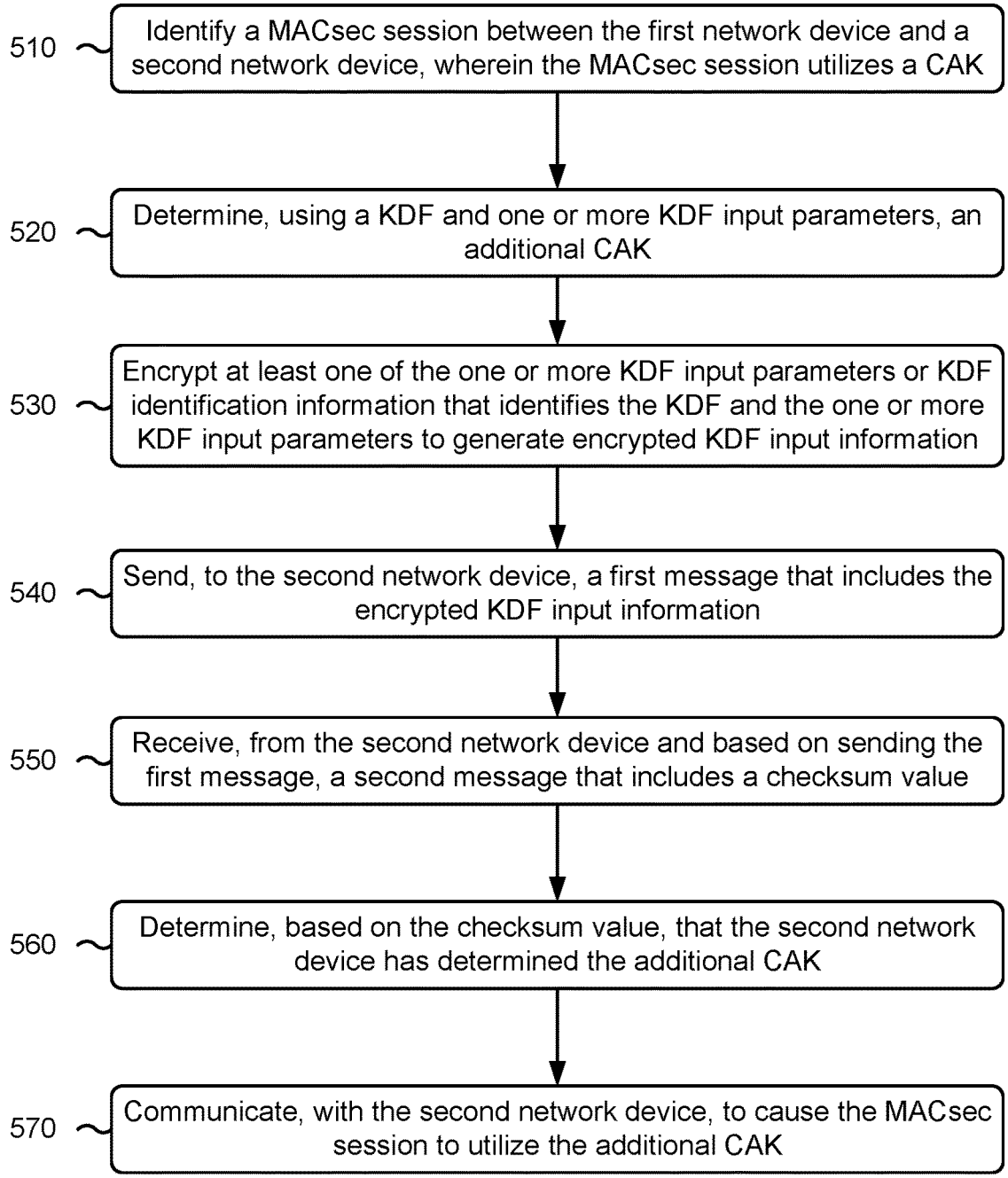
FIGS. 5 and 6 are flowcharts of example processes associated with automatic generation and update of CAKs for MACsec protocol.

FIG. 5 is a flowchart of an example process 500 associated with automatic generation and update of CAKs for MACsec protocol. In some implementations, one or more process blocks of FIG. 5 are performed by a first network device (e.g., network device 210-1). In some implementations, one or more process blocks of FIG. 5 are performed by another device or a group of devices separate from or including the first network device, such as a second network device (e.g., network device 210-2). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 5, process 500 may include identifying a MACsec session between the first network device and a second network device, wherein the MACsec session utilizes a CAK (block 510). For example, the first network device may identify a MACsec session between the first network device and a second network device, as described above. In some implementations, the MACsec session utilizes a CAK.

As further shown in FIG. 5, process 500 may include determining, using a KDF and one or more KDF input parameters, an additional CAK (block 520). For example, the first network device may determine, using one or more KDF input parameters, an additional CAK, as described above.

As further shown in FIG. 5, process 500 may include encrypting at least one of the one or more KDF input parameters or KDF identification information that identifies the KDF and the one or more KDF input parameters to generate encrypted KDF input information (block 530). For example, the first network device may encrypt at least one of the one or more KDF input parameters or KDF identification information that identifies the KDF and the one or more KDF input parameters to generate encrypted KDF input information, as described above.

As further shown in FIG. 5, process 500 may include sending, to the second network device, a first message that includes the encrypted KDF input information (block 540). For example, the first network device may send, to the second network device, a first message that includes the encrypted KDF input information, as described above.

As further shown in FIG. 5, process 500 may include receiving, from the second network device and based on sending the first message, a second message that includes a checksum value (block 550). For example, the first network device may receive, from the second network device and based on sending the first message, a second message that includes a checksum value, as described above.

As further shown in FIG. 5, process 500 may include determining, based on the checksum value, that the second network device has determined the additional CAK (block 560). For example, the first network device may determine, based on the checksum value, that the second network device has determined the additional CAK, as described above.

As further shown in FIG. 5, process 500 may include communicating, with the second network device, to cause the MACsec session to utilize the additional CAK (block 570). For example, the first network device may communicate, with the second network device, to cause the MACsec session to utilize the additional CAK, as described above.

Process 500 may include additional implementations, such as any single implementation or any combination of implementations described below and/or in connection with one or more other processes described elsewhere herein.

In a first implementation, the one or more KDF input parameters include at least one of a KDF parameter, a key parameter, a label parameter, or a context parameter.

In a second implementation, alone or in combination with the first implementation, the encrypted KDF input information is encrypted using a SAK or a KEK, each of which is associated with the MACsec session.

In a third implementation, alone or in combination with one or more of the first and second implementations, the first message is an MKPDU.

In a fourth implementation, alone or in combination with one or more of the first through third implementations, the encrypted KDF input information is included in a CAK name field of the MKPDU.

In a fifth implementation, alone or in combination with one or more of the first through fourth implementations, the second message is an MKPDU.

In a sixth implementation, alone or in combination with one or more of the first through fifth implementations, the checksum value is included in a CAK name field of the MKPDU.

In a seventh implementation, alone or in combination with one or more of the first through sixth implementations, the checksum value is associated with the second network device determining the additional CAK based on the encrypted KDF input information.

In an eighth implementation, alone or in combination with one or more of the first through seventh implementations, the first message includes an indicator indicating that the first message includes the encrypted KDF input information, wherein the second network device is to process the first message to identify the indicator and the encrypted KDF input information; decrypt, based on the indicator, the encrypted KDF input information to determine at least one of the one or more KDF input parameters or the KDF identification information; and determine, based on determining the at least one of the one or more KDF input parameters or the KDF identification information, the additional CAK.

In a ninth implementation, alone or in combination with one or more of the first through eighth implementations, the encrypted KDF input information is encrypted using an encryption key associated with the additional CAK.

In a tenth implementation, alone or in combination with one or more of the first through ninth implementations, the encrypted KDF input information is included in a CAK name field of the first message.

In an eleventh implementation, alone or in combination with one or more of the first through tenth implementations, the first message includes an indicator indicating that the first message includes the encrypted KDF input information.

In a twelfth implementation, alone or in combination with one or more of the first through eleventh implementations, the second message includes a checksum value, wherein the checksum value is associated with the second network device determining the additional CAK based on the encrypted KDF input information.

In a thirteenth implementation, alone or in combination with one or more of the first through twelfth implementations, the second message includes a checksum value and an indicator indicating that the second message includes the checksum value.

In a fourteenth implementation, alone or in combination with one or more of the first through thirteenth implementations, communicating to cause the MACsec session to utilize the additional CAK includes processing the second message to determine a checksum value included in the second message; processing the additional CAK to determine an additional checksum value; validating, based on the additional checksum value, the checksum value; and communicating, with the second network device and based on validating the checksum value, to cause the MACsec session to utilize the additional CAK.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

Figure 6:
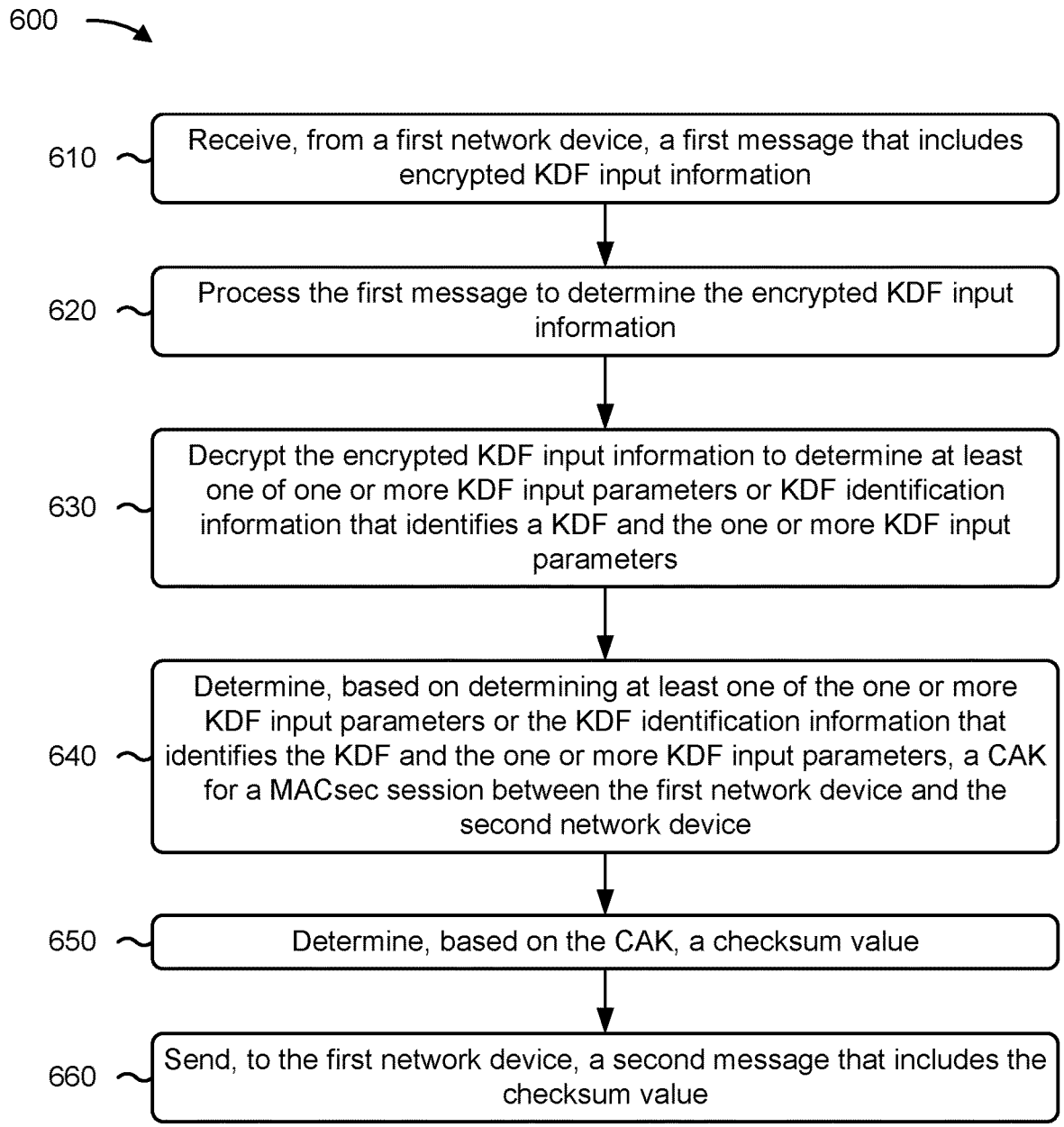

FIG. 6 is a flowchart of an example process 600 associated with automatic generation and update of CAKs for MACsec protocol. In some implementations, one or more process blocks of FIG. 6 are performed by a second network device (e.g., network device 210-2). In some implementations, one or more process blocks of FIG. 6 are performed by another device or a group of devices separate from or including the second network device, such as a first network device (e.g., network device 210-1). Additionally, or alternatively, one or more process blocks of FIG. 6 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 6, process 600 may include receiving, from a first network device, a first message that includes encrypted KDF input information (block 610). For example, the second network device may receive, from a first network device, a first message that includes encrypted KDF input information, as described above.

As further shown in FIG. 6, process 600 may include processing the first message to determine the encrypted KDF input information (block 620). For example, the second network device may process the first message to determine the encrypted KDF input information, as described above.

As further shown in FIG. 6, process 600 may include decrypting the encrypted KDF input information to determine at least one of one or more KDF input parameters or KDF identification information that identifies the KDF and the one or more KDF input parameters (block 630). For example, the second network device may decrypt the encrypted KDF input information to determine at least one of one or more KDF input parameters or KDF identification information that identifies the KDF and the one or more KDF input parameters, as described above.

As further shown in FIG. 6, process 600 may include determining, based on determining at least one of the one or more KDF input parameters or the KDF identification information that identifies the KDF and the one or more KDF input parameters, a CAK for a MACsec session between the first network device and the second network device (block 640). For example, the second network device may determine, based on determining at least one of the one or more KDF input parameters or the KDF identification information that identifies the KDF and the one or more KDF input parameters, a CAK for a MACsec session between the first network device and the second network device, as described above.

As further shown in FIG. 6, process 600 may include determining, based on the CAK, a checksum value (block 650). For example, the second network device may determine, based on the CAK, a checksum value, as described above.

As further shown in FIG. 6, process 600 may include sending, to the first network device, a second message that includes the checksum value (block 660). For example, the second network device may send, to the first network device, a second message that includes the checksum value, as described above.

Process 600 may include additional implementations, such as any single implementation or any combination of implementations described below and/or in connection with one or more other processes described elsewhere herein.

In a first implementation, process 600 includes communicating, with the first network device and based on sending the second message, to cause the MACsec session to utilize the CAK.

In a second implementation, alone or in combination with the first implementation, at least one of the first message and the second message is an MKPDU.

In a third implementation, alone or in combination with one or more of the first and second implementations, the second message includes an indicator indicating that the second message includes the checksum value.

Although FIG. 6 shows example blocks of process 600, in some implementations, process 600 includes additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    identifying, by a first network device, a Media Access Control Security (MACsec) session between the first network device and a second network device,
        wherein the MACsec session utilizes a connectivity association key (CAK);
    determining, by the first network device and using a key derivation function (KDF) and one or more KDF input parameters, an additional CAK;
    encrypting, by the first network device, at least one of the one or more KDF input parameters or KDF identification information that identifies the KDF and the one or more KDF input parameters to generate encrypted KDF input information;
    sending, by the first network device and to the second network device, a first message that includes the encrypted KDF input information;
    receiving, by the first network device, from the second network device, and based on sending the first message, a second message that includes a checksum value,
        wherein the second message is a MACsec key agreement protocol data unit (MKPDU), and
        wherein the checksum value is included in a CAK name field of the MKPDU;
    determining, by the first network device and based on the checksum value, that the second network device has determined the additional CAK; and
    communicating, by the first network device and with the second network device, to cause the MACsec session to utilize the additional CAK.

2. The method of claim 1, wherein the one or more KDF input parameters include at least one of:
    a KDF parameter,
    a key parameter,
    label parameter, or
    context parameter.

3. The method of claim 1, wherein the encrypted KDF input information is encrypted using a secure association key (SAK) or a key encryption key (KEK), each of which is associated with the MACsec session.

4. The method of claim 1, wherein the first message is a MKPDU.

5. The method of claim 4, wherein the encrypted KDF input information is included in a CAK name field of the MKPDU.

6. The method of claim 1, wherein the checksum value is associated with the second network device determining the additional CAK based on the encrypted KDF input information.

7. The method of claim 1, wherein the first message includes an indicator indicating that the first message includes the encrypted KDF input information, wherein the second network device is to:
    process the first message to identify the indicator and the encrypted KDF input information;
    decrypt, based on the indicator, the encrypted KDF input information to determine at least one of the one or more KDF input parameters or the KDF identification information; and
    determine, based on determining the at least one of the one or more KDF input parameters or the KDF identification information, the additional CAK.

8. A first network device, comprising:
    one or more memories; and
    one or more processors to:
        identify a Media Access Control Security (MACsec) session between the first network device and a second network device,
            wherein the MACsec session utilizes a connectivity association key (CAK);
        determine, using a key derivation function (KDF) and one or more KDF input parameters, an additional CAK;
        encrypt at least one of the one or more KDF input parameters or KDF identification information that identifies the KDF and the one or more KDF input parameters to generate encrypted KDF input information;
        send, to the second network device, a first message that includes the encrypted KDF input information;
        receive, from the second network device and based on sending the first message, a second message that includes a checksum value,
            wherein the second message is a MACsec key agreement protocol data unit (MKPDU), and
            wherein the checksum value is included in a CAK name field of the MKPDU;
        determine, based on the checksum value, that the second network device has determined the additional CAK; and
        communicate, with the second network device and based on the second message, to cause the MACsec session to utilize the additional CAK.

9. The first network device of claim 8, wherein the encrypted KDF input information is encrypted using an encryption key associated with the additional CAK.

10. The first network device of claim 8, wherein the encrypted KDF input information is included in a CAK name field of the first message.

11. The first network device of claim 8, wherein the first message includes an indicator indicating that the first message includes the encrypted KDF input information.

12. The first network device of claim 8,
wherein the checksum value is associated with the second network device determining the additional CAK based on the encrypted KDF input information.

13. The first network device of claim 8, wherein the second message includes an indicator indicating that the second message includes the checksum value.

14. The first network device of claim 8, wherein the one or more processors, to communicate to cause the MACsec session to utilize the additional CAK, are to:
process the second message to determine the checksum value included in the second message;
process the additional CAK to determine an additional checksum value;
validate, based on the additional checksum value, the checksum value; and
communicate, with the second network device and based on validating the checksum value, to cause the MACsec session to utilize the additional CAK.

15. A non-transitory computer-readable medium storing a set of instructions, the set of instructions comprising:
one or more instructions that, when executed by one or more processors of a first network device, cause the first network device to:
identify a Media Access Control Security (MACsec) session between the first network device and a second network device,
wherein the MACsec session utilizes a connectivity association key (CAK);
determine, using a key derivation function (KDF) and one or more KDF input parameters, an additional CAK;
encrypt at least one of the one or more KDF input parameters or KDF identification information that identifies the KDF and the one or more KDF input parameters to generate encrypted KDF input information;
send, to the second network device, a first message that includes the encrypted KDF input information;
receive, from the second network device and based on sending the first message, a second message that includes a checksum value,
wherein the second message is a MACsec key agreement protocol data unit (MKPDU), and
wherein the checksum value is included in a CAK name field of the MKPDU;
determine, based on the checksum value, that the second network device has determined the additional CAK; and
communicate, with the second network device and based on the second message, to cause the MACsec session to utilize the additional CAK.

16. The non-transitory computer-readable medium of claim 15, wherein the encrypted KDF input information is encrypted using an encryption key associated with the additional CAK.

17. The non-transitory computer-readable medium of claim 15, wherein the first message includes an indicator indicating that the first message includes the encrypted KDF input information.

18. The non-transitory computer-readable medium of claim 15,
wherein the checksum value is associated with the second network device determining the additional CAK based on the encrypted KDF input information.

19. The non-transitory computer-readable medium of claim 15, wherein the second message includes an indicator indicating that the second message includes the checksum value.

20. The non-transitory computer-readable medium of claim 15, wherein the one or more instructions further cause the first network device to communicate to cause the MACsec session to utilize the additional CAK, are to:
process the second message to determine the checksum value included in the second message;
process the additional CAK to determine an additional checksum value;
validate, based on the additional checksum value, the checksum value; and
communicate, with the second network device and based on validating the checksum value, to cause the MACsec session to utilize the additional CAK.

* * * * *

UNITED STATES PATENT AND TRADEMARK OFFICE
CERTIFICATE OF CORRECTION

PATENT NO. : 12,200,111 B2
APPLICATION NO. : 17/808351
DATED : January 14, 2025
INVENTOR(S) : Nandan Debnath et al.

Page 1 of 1

It is certified that error appears in the above-identified patent and that said Letters Patent is hereby corrected as shown below:

In the Claims

Claim 2:
Column 16, Line 8 change "label parameter, or" to --a label parameter, or--

Claim 2:
Column 16, Line 9 change "context parameter." to --a context parameter.--

Signed and Sealed this
Seventh Day of October, 2025

John A. Squires
*Director of the United States Patent and Trademark Office*